Jan. 24, 1961

L. E. GOFF, JR 2,969,485

ELECTRIC RELAY

Filed Oct. 25, 1957

Inventor:
Leon E. Goff, Jr.,
by J. Wesley Haubner
His Attorney.

Jan. 24, 1961  L. E. GOFF, JR  2,969,485
ELECTRIC RELAY

Filed Oct. 25, 1957  3 Sheets-Sheet 2

Inventor:
Leon E. Goff, Jr.,
by His Attorney.

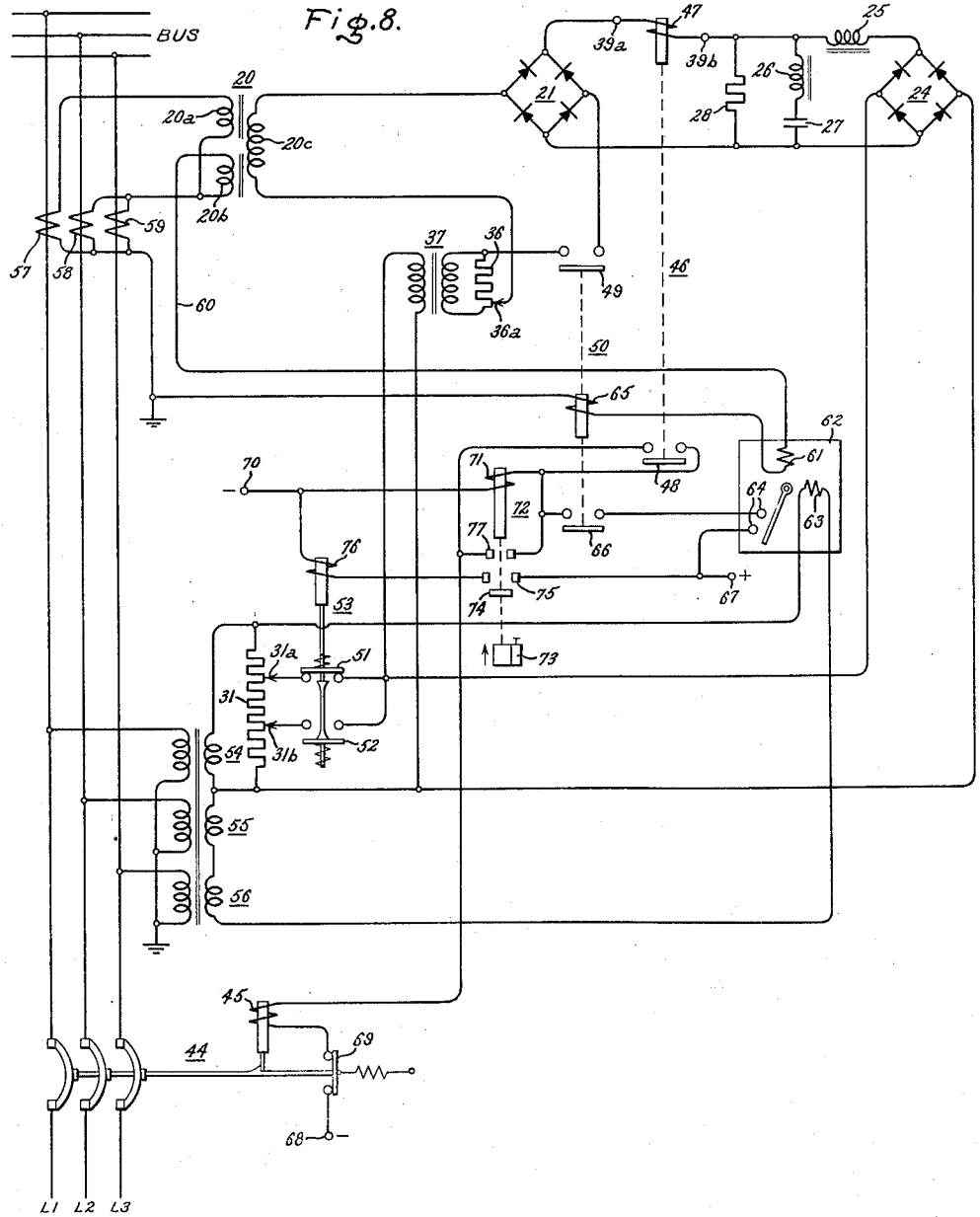

United States Patent Office 2,969,485
Patented Jan. 24, 1961

2,969,485

ELECTRIC RELAY

Leon E. Goff, Jr., Drexel Hill, Pa., assignor to General Electric Company, a corporation of New York Filed Oct. 25, 1957, Ser. No. 692,315

11 Claims. (Cl. 317—36)

This invention relates to electric relays, and more particularly to "distance" relays for protecting alternating current electric power transmission lines.

A distance relay of conventional construction typically comprises an arrangement of electromagnets, a movable armature or an induction rotor, and contacts carried by the armature or rotor to perform a preselected control function, such as completing the tripping circuit of a circuit interrupter, whenever the relay operates. The electromagnets of the conventional relay are provided with windings connected to be energized by transmission line current I and transmission line voltage E, and these windings establish magnetic fluxes in proportion to their respective energizing quantities. The magnetic fluxes interact in the movable armature or rotor to produce opposing driving and restraining torques, and relay operation is obtained whenever there is net torque in the proper direction to close the contacts. The operating characteristic of such a relay is conveniently expressed in terms of the ratio of line voltage to line current ($E/I$), or in other words apparent impedance of the transmission line, that will cause relay operation. The actual impedance of the protected transmission line per unit length has a determinable value, and the ratio $E/I$ during a short circuit or fault condition will be a measure of the length of line between the relay and the fault location. Therefore, the above described relay is properly known as a distance relay.

It is a general object of this invention to provide a relatively compact and inexpensive electric relay having the operating characteristic of a distance relay without utilizing the conventional structure described above.

It is another object of the invention to provide a general purpose distance relay which eliminates the need for conventional electromagnets and movable armature or induction rotor.

Still another object of the invention is the provision of improved offset-impedance and angle-impedance relays having no moving parts.

A further object of the invention is the provision of an improved form of distance relay the operation of which may be conveniently supervised by simple switching means.

In carrying out my invention in one form, a distance relay is adapted to control an electroresponsive device in response to predetermined relationships between electric quantities in an alternating current electric power transmission line. The electroresponsive device is operable when energized to perform a preselected protective function. In accordance with my invention, means responsive to a first alternating quantity derived from the transmission line is provided for producing a direct voltage representative of the transmission line voltage. Also provided is means responsive to a second alternating quantity proportional to the transmission line current and to a third alternating quantity having a predetermined relationship to said first quantity for producing another direct voltage representative of the vector difference between the second and third quantities. Coupling means interconnects the electroresponsive device and the direct voltage producing means to form a unilaterally conductive loop circuit wherein the direct voltages are oppositely poled, and smoothing means is provided for smoothing the first-mentioned direct voltage. The loop circuit is arranged so that the electroresponsive device is operably energized only in response to the magnitude of the second-mentioned direct voltage exceeding the magnitude of the other direct voltage.

My invention will be better understood and its various objects and advantages will be more fully appreciated from the following description taken in conjunction with the accompanying drawings in which:

Fig. 8 is a schematic representation of a protective relaying system illustrating one practical application of the Fig. 7 embodiment of my invention.

Figure 1:
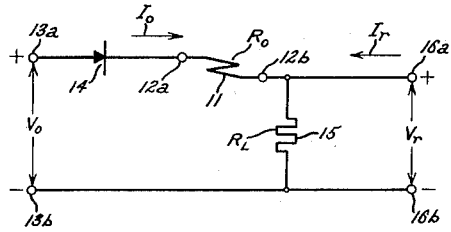
Fig. 1 is a circuit diagram illustrating a basic principle of my invention.

Before proceeding with detailed descriptions of the various illustrated embodiments of the invention, reference will be made to Fig. 1 which illustrates the basic principle common to each of the embodiments. In Fig. 1, the reference number 11 identifies the sensing element of an electroresponsive device to be operated. By energizing the sensing element 11 with unidirectional current $I_0$ greater than a predetermined magnitude, operation of the electroresponsive device is obtained. Since it forms no part of my invention, the electroresponsive device itself has not been shown, and this device may be of any suitable type preferably characterized by extreme sensitivity. Accordingly, it may be assumed that said predetermined magnitude of unidirectional current is very low, e.g., .0015 ampere. The internal impedance of the sensing element 11 is designated $R_0$, and this element is connected to a pair of terminals 12a and 12b.

As can be seen in Fig. 1, the terminals 12a and 12b and the sensing element 11 are connected in a unilaterally conductive loop circuit comprising a pair of input terminals 13a and 13b, a half-wave rectifier 14 and a load resistor 15. A unipolarity operating voltage $V_o$ is applied across input terminals 13a and 13b, and, by means of another pair of input terminals 16a and 16b, a unipolarity reference voltage $V_r$ is applied across the load resistor 15. The operating and reference voltages are poled so that input terminal 13a is positive with respect to terminal 13b and input terminal 16a is positive with respect to terminal 16b. In other words, the operating and reference voltages are applied to the terminals 12a and 12b in voltage opposing relationship, and the magnitudes of these two voltages may be compared in the loop circuit. The impedance of load resistor 15 is designated $R_L$. It may be assumed that the forward impedance of rectifier 14 as well as the impedances of all remaining portions of the illustrated circuit are negligible.

Inspection of Fig. 1 reveals that current $I_o$ flows only when the operating voltage $V_o$ is greater than the reference voltage $V_r$, and that the magnitude of $I_o$ is equal to $$\frac{V_o - V_r}{R_o}$$

Since a very small amount of current $I_o$ will operably energize the sensing element 11, it is a fair approximation to say that operation of the electro-responsive device is obtained whenever $V_o$ exceeds $V_r$. Thus, the threshold of operation is reached when the operating and reference voltages are just equal, and this critical relationship will prove useful in representing the operating characteristics of the specific relays described below.

Figure 2:
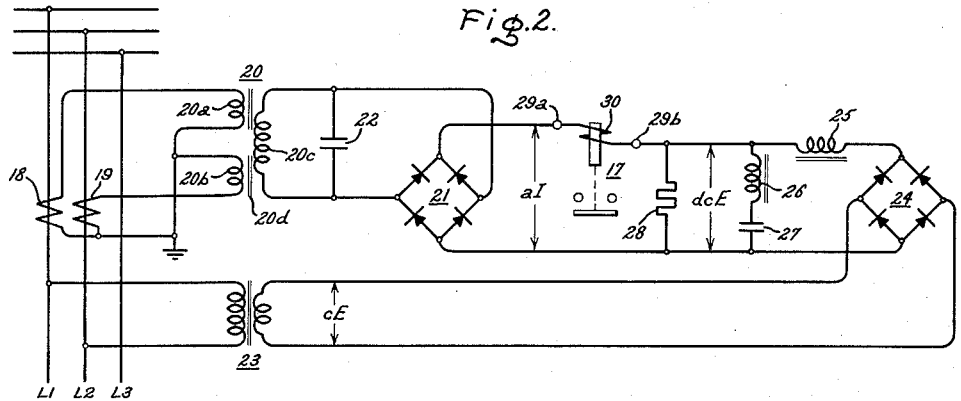
Fig. 2 is a schematic diagram of an impedance relay.

In Fig. 2 I have shown a distance relay of the impedance type for protecting an alternating current electric power transmission line which is represented by phase conductors L1, L2 and L3. The relay is designed to operate in response to predetermined faults or short circuit conditions involving phase conductors L1 and L2. Operation of the relay actuates a sensitive electroresponsive device, such as, for example, the illustrated electromagnet switching device 17, and this device may be used to initiate a suitable protective function, such as tripping a circuit interrupter not shown.

In the impedance relay, an operating voltage proportional to transmission line current is compared with a reference voltage proportional to transmission line voltage. To obtain the operating voltage, two star-connected current transformers 18 and 19 are coupled to phase conductors L1 and L2, respectively, as is shown in Fig. 2. The secondary circuits of these current transformers supply suitable transforming means 20 which, for the purposes of the illustrated embodiments of my invention, preferably comprises a pair of primary windings 20a and 20b, a secondary winding 20c, and a common iron core 20d having at least one air gap. The primary windings 20a and 20b are supplied by current transformers 18 and 19 respectively. These two primary windings have an equal number of turns, and total ampere turns in the transforming means 20 is proportional to the vectorial difference between the transmission line currents flowing in conductors L1 and L2. Thus, the primary windings 20a and 20b effectively simulate a single primary winding supplied by current from delta-connected current transformers.

Transforming means 20 derives across its secondary winding 20c an alternating voltage representative of phase current in the transmission line both in magnitude and phase over the operating range of current. In other words, the derived alternating voltage is related to phase current by a predetermined constant impedance. The transforming means 20 imposes minimum burden on current transformers 18 and 19, and due to the high percentage of total primary current used for magnetizing iron core 20d and its air gap, no appreciable initial transient D.-C. component of fault current will be reproduced in the alternating voltage. The transforming means 20 also serves as a desirable means for electrically insulating succeeding relay circuits from the current transformer connections.

As can be seen in Fig. 2, suitable rectifying means such as the illustrated full-wave bridge type rectifier 21 is connected to the secondary winding 20c of transforming means 20. An appropriate capacitor 22 may be connected across the secondary winding 20c in order to shorten the response time of the relay. The peak magnitude of the voltage supplied to the alternating current terminals of rectifier 21 is equal to $aI$, where $I$ is the R.M.S. value of phase current in the protected transmission line and $a$ is a preselected constant in units of ohms. The magnitude of the constant $a$ may be determined by appropriate selection of the turns ratio of the current transformers 18 and 19 and of transforming means 20. The rectified voltage produced at the direct current terminals of rectifier 21, which voltage is an accurate representation of transmission line current, comprises the operating voltage of the impedance relay.

The reference voltage of the impedance relay is obtained by means of a potential transformer 23 coupled to phase conductors L1 and L2, as is shown in Fig. 2. This transformer derives across its secondary winding an alternating voltage having a peak magnitude $cE$ which is proportional to the R.M.S. value of phase-to-phase transmission line voltage $E$ by a predetermined constant $c$. A full-wave bridge type rectifier 24 is connected across the secondary winding of transformer 23 to rectify the alternating voltage.

A suitable smoothing circuit is connected across the direct current terminals of rectifier 24. This circuit may comprise, for example, a low-pass $m$-derived filter comprising a series inductance or choke coil 25, a parallel choke coil 26 and capacitor 27, and a load resistor 28 connected in the manner shown in Fig. 2. The parameters of the illustrated smoothing circuit may be selected to produce across load resistor 28 a relatively smooth direct voltage having only a small ripple component (e.g. less than ten percent) without adversely affecting the response time of the relay.

The magnitude of the relatively smooth direct voltage continuously developed across load resistor 28 is equal to $dcE$, where $d$ is a predetermined constant which is less than but approaches unity. This direct voltage, which is an accurate representation of transmission line voltage, comprises the reference voltage of the impedance relay. For the purposes of the present description, the reference voltage $dcE$ may be assumed ideally smooth with negligible ripple factor.

The negative terminals of the rectifiers 21 and 24 and of load resistor 28 are all connected in common, as can be seen in Fig. 2. The positive direct current terminal of rectifier 21 is coupled to an output terminal 29a, and the positive terminal of load resistor 28 is coupled to another output terminal 29b. A sensing element 30 of the sensitive electromagnetic switching device 17 is connected between the output terminals 29a and 29b. In accordance with the basic principle illustrated in Fig. 1 and discussed hereinbefore, the sensing element 30 will be operably energized whenever the magnitude of operating voltage exceeds the magnitude of reference voltage, and the threshold of operation obtains just as these two quantities reach their critical relationship of equality. This condition of equality for the Fig. 2 embodiment of my invention is $aI=dcE$, and the relationship may be expressed in the alternative as:

$$Z=\frac{a}{dc} \qquad (1)$$

where $Z$ is the ratio of transmission line voltage $E$ to transmission line current $I$, or in other words, the apparent impedance of the transmission line as viewed from the relay location. Equation 1 defines the operating characteristic of an impedance relay.

During a short circuit or fault condition on the transmission line, the ratio $E/I$ is the actual impedance of the transmission line between the relay and the fault location. If the fault is located within a predetermined distance from the relay, whereby the impedance to the fault is less than the constant $$\frac{a}{dc}$$

the peak magnitude of operating voltage must be greater than the magnitude of the reference voltage, and relay operation is obtained. More distant faults will not cause relay operation.

Figure 6:
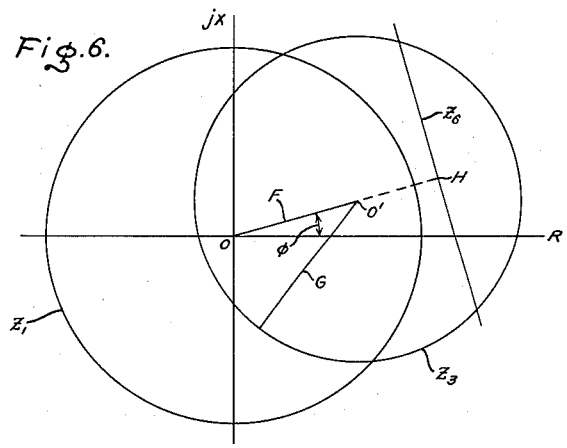
Fig. 6 is an explanatory diagram showing the operating characteristics, in terms of impedance, of the various embodiments of my invention.

The operating characteristic of the impedance relay shown in Fig. 2 may be conveniently illustrated by a conventional impedance diagram as is done in Fig. 6. The origin O of the impedance diagram represents the point or terminal where the potential and current transformers which supply the relay are coupled to the transmission line, while the abscissa R and the ordinate $jX$ describe values of resistance and inductive reactance respectively as determined by the vectorial relationship between transmission line voltage and current measured by these transformers. Both coordinates R and jX are scaled equally and in the same units, such as ohms.

The circle identified in Fig. 6 by the reference character $Z_1$ represents the loci of apparent impedance values which define the operating range of the Fig. 2 impedance relay. The radius of circle $Z_1$ is equal to the constant $$\frac{a}{dc}$$

Whenever the apparent impedance is less than this predetermined constant magnitude, the operating voltage is greater than the reference voltage and the impedance relay will operate.

It is apparent from inspection of Fig. 6 that the operating range of the impedance relay extends equally in all directions from the local terminal O. By offsetting the impedance circle, it is possible to introduce directional discrimination into the relay operating characteristic, and this has been done in the Fig. 3 and Fig. 7 embodiments of my invention.

Figure 3:
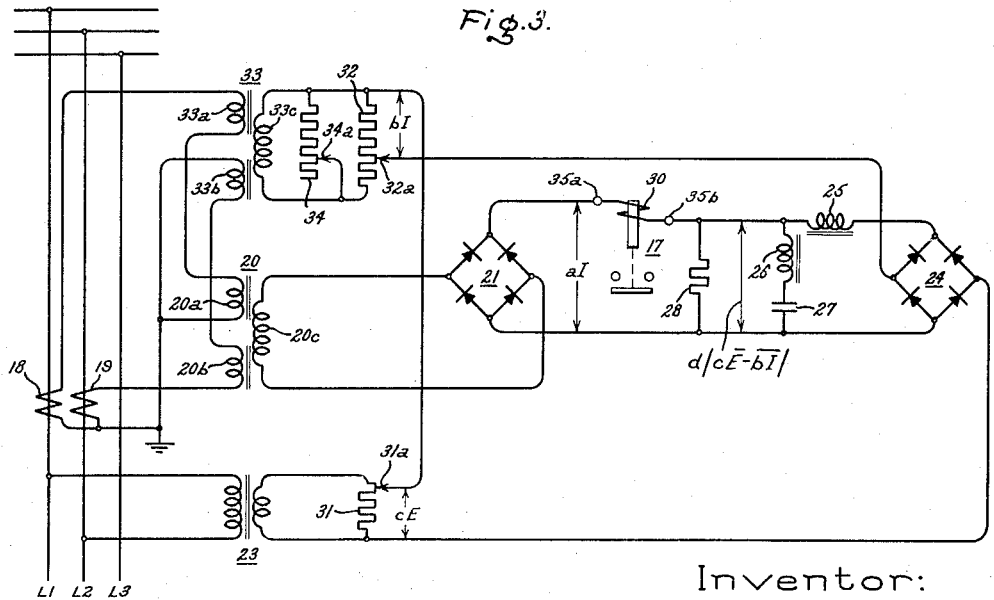
Fig. 3 is a schematic diagram of an offset-impedance relay embodying my invention.

In Fig. 3 I have shown a distance relay of the offset-impedance type. In this relay an operating voltage proportional to transmission line current is compared with a reference voltage proportional to a vectorial relationship between transmission line voltage and current.

For the sake of convenience and orientation, certain circuit components of the offset-impedance relay in Fig. 3 which correspond to components of the impedance relay shown in Fig. 2 have been assigned identical reference characters. Thus, in Fig. 3, a unipolarity operating voltage representative of transmission line current I is produced by means of current transformers 18 and 19, transforming means 20, and full-wave rectifier 21, as was done in connection with the impedance relay described above, and the peak magnitude of this voltage is $aI$.

As can be seen in Fig. 3, a potentiometer 31 having a slider 31a is connected across the secondary winding of potential transformer 23, and derived across the tapped portion of this potentiometer is an alternating voltage having a peak magnitude $cE$ proportional to the transmission line voltage E by a constant $c$ which is determined by the position of slider 31a. The potentiometer 31 is connected in series circuit combination with another potentiometer 32 having a slider 32a.

The potentiometer 32 is connected across the secondary winding 33c of transforming means 33 which may be similar to transforming means 20 described hereinbefore. The two primary windings 33a and 33b for transforming means 33 are connected to the current transformers 18 and 19, respectively, in series circuit relationship with the primary windings 20a and 20b of transforming means 20. An adjustably tapped resistor 34 including a slider 34a is connected in parallel with potentiometer 32 across secondary winding 33c to provide means for varying the secondary load connected to the transforming means 33.

An alternating voltage having a peak magnitude $bI$ is developed across the tapped portion of potentiometer 32. This voltage, as determined by the position of sliders 32a and 34a, has a fixed magnitude and phase relationship to the phase current in the transmission line. This constant vectorial relationship $\overline{b}$ is in units of ohms, and the derived voltage $\overline{bI}$ leads phase current by a phase angle $\phi$. Open circuit secondary voltage will lead phase current by 90 electrical degrees, and as the secondary load is increased, the angle of lead becomes less. By appropriate modification of the circuit shown, the angle $\phi$ could be made equal to zero.

The respective circuits in Fig. 3 are poled so that the voltage which appears across the series combination of potentiometers 31 and 32 comprises the vector difference between the derived voltage $c\overline{E}$ and $\overline{bI}$, or in other words $c\overline{E}-\overline{bI}$. The difference voltage across this series combination is rectified by a full-wave rectifier 24 and smoothed by a filter circuit comprising series choke coil 25, parallel choke coil 26 and capacitor 27, and load resistor 28, as can be seen in Fig. 3. These circuit components may be selected to be the same as the correspondingly identified components described hereinbefore in connection with the impedance relay of Fig. 2. The voltage across load resistor 28 comprises the reference voltage of the offset-impedance relay, and the magnitude of this relatively smooth direct voltage is equal to $d|c\overline{E}-\overline{bI}|$, where $d$ is a predetermined constant determined by the degree of filtering employed. Thus, the reference voltage is an accurate representation of the vector difference between transmission line voltage and an alternating voltage having a predetermined constant relationship to transmission line current.

As is shown in Fig. 3, the negative terminals of the rectifiers 21 and 24 and of load resistor 28 are all connected in common. The positive direct current terminal of rectifier 21 is connected to an output terminal 35a, and the positive terminal of load resistor 28 is connected to another output terminal 35b. A sensing element 30 of the sensitive electromagnetic switching device 17 is connected between the output terminals 35a and 35b. In accordance with the basic principle illustrated in Fig. 1 and discussed hereinbefore, the sensing element 30 is operably energized in response to an output control signal produced by the offset-impedance relay only when the magnitude of operating voltage exceeds the magnitude of reference voltage. The critical relationship of equality between operating and reference voltages for the offset-impedance relay shown in Fig. 3 is $aI=d|c\overline{E}-\overline{bI}|$.

Figure 4:
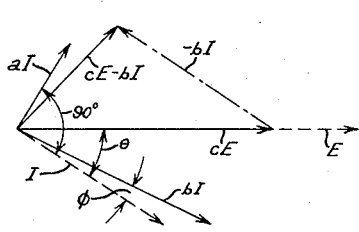
Fig. 4 is a vector diagram of certain voltage relationships obtained in the Fig. 3 embodiment of my invention.
Figure 5:
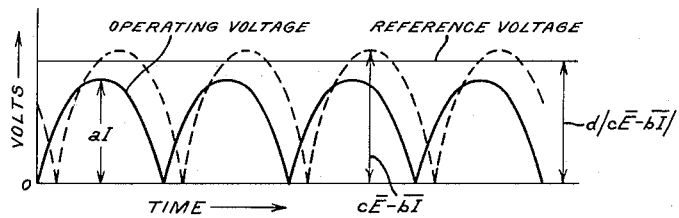
Fig. 5 is a voltage-time diagram of certain voltage relationships in the Fig. 3 embodiment.

For a clearer understanding of my invention, the various voltage relationships described above for the offset-impedance relay have been illustrated graphically in Figs. 4 and 5. In the Fig. 4 vector diagram, the transmission line voltage $\overline{E}$ is the reference vector, and the derived voltage $c\overline{E}$ is in phase with $\overline{E}$. Transmission line current $\overline{I}$ lags $\overline{E}$ by a power factor angle $\theta$. The operating voltage $\overline{aI}$ which is derived by transforming means 20 will lead current $\overline{I}$ by approximately 90 degrees, while the voltage $\overline{bI}$ derived by transforming means 33 leads $\overline{I}$ by the angle $\phi$. The vector difference between the derived voltages $c\overline{E}$ and $\overline{bI}$, or in other words the vector $c\overline{E}-\overline{bI}$, is clearly indicated in Fig. 4.

The relationship between the difference voltage before rectification and smoothing and the reference voltage can be seen in the Fig. 5 voltage-time diagram. The instantaneous difference voltage (both positive and negative half cycles) is represented in Fig. 5 by the sinusoidal broken line, and the reference voltage $d|c\overline{E}-\overline{bI}|$ has been assumed ideally smooth with negligible ripple factor. Thus, the magnitude of the reference voltage is slightly less than the peak magnitude $c\overline{E}-\overline{bI}$ of the difference voltage. The operating voltage is also shown in Fig. 5, and for the particular conditions illustrated, the peak magnitude $aI$ of the operating voltage is less than the magnitude of reference voltage. In the unilaterally conductive loop circuit comprising sensing element 30, load resistor 28, rectifier 21 and secondary winding 20c of Fig. 3, the difference between the instantaneous operating voltage magnitude and the reference voltage, as long as the latter is greater, appears across the individual rectifying elements of the full-wave rectifier 21. Accordingly, the rectifier 21 is rendered non-conductive, output terminals 35a and 35b are at the same potential, and no current can flow to energize the sensing element 30.

Whenever operating voltage exceeds reference voltage, output terminal 35a of the offset-impedance relay will be positive with respect to output terminal 35b during at least some portion of each half cycle, and the resulting intermittent voltage drop across terminals 35a and 35b, which voltage comprises the output control signal of the relay, causes corresponding pulses of current to flow in the sensing element 30 of the switching device 17. The switching device, being extremely sensitive, operably responds to a very low level of this energizing current. In this manner, operation of the offset-impedance relay is obtained.

The magnitude of reference voltage $d|\overline{cE-bI}|$ is equal to $d\sqrt{[cE-bI\cos(\theta-\phi)]^2+[bI\sin(\theta-\phi)]^2}$. By equating this quantity to $aI$ and reducing, the condition of equal operating and reference voltages for the Fig. 3 embodiment of my invention may be expressed as follows:

$$c^2d^2Z^2 - 2bcd^2\cos(\theta-\phi)Z - a^2 + b^2d^2 = 0 \quad (2)$$

where Z is the ratio $E/I$ or apparent impedance of the transmission line. Equation 2 can be solved for Z by quadratic equation:

$$Z = \frac{b}{c}\cos(\theta-\phi) \pm \sqrt{\left[\frac{b}{c}\cos(\theta-\phi)\right]^2 + \frac{a^2-b^2d^2}{c^2d^2}} \quad (3)$$

Equation 3 defines the operating characteristic of an offset-impedance relay.

The operating characteristic Equation 3 has been plotted on the impedance diagram shown in Fig. 6, and the circle identified on this diagram by the reference character $Z_3$ represents the loci of apparent impedance values which define the operating range of the Fig. 3 embodiment of my invention. The radius G of circle $Z_3$ is equal to the constant $$\frac{a}{cd}$$

and the center O' of this circle is offset from the origin O by the vector $\overline{F}$ having a constant magnitude $$\frac{b}{c}$$

and an angle $\phi$ with respect to the R axis. Whenever a transmission line fault is so located that the impedance to the fault falls within circle $Z_3$, the peak magnitude of operating voltage will be greater than the magnitude of reference voltage, and the offset impedance relay produces an output control signal. Thus, the output control signal of the relay is a function of transmission line impedance.

Several significant changes may be made in the illustrated operating characteristic of the offset-impedance relay merely by an appropriate selection of constants. If the constant $a$ were made less than the product of $b$ and $d$, the offset F of circle $Z_3$ would be greater than the radius G, and the circle would exclude the origin O. If the constant $a$ is made equal to $bd$, the offset F and radius G will be equal to each other, and the circle $Z_3$ will pass through the origin O.

Figure 7:
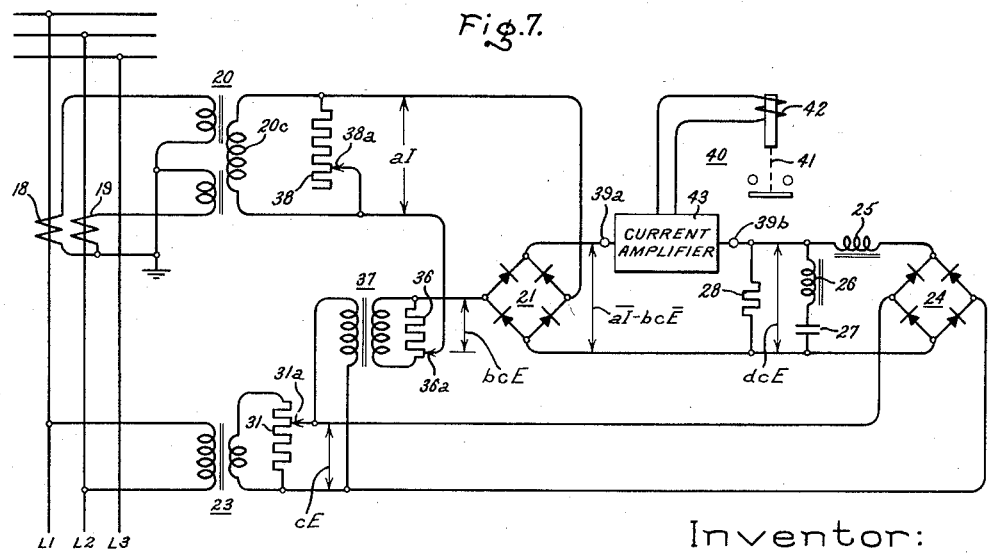
Fig. 7 is a schematic diagram of an angle-impedance relay embodying my invention.

The operating characteristic of an offset-impedance type distance relay may also be obtained in accordance with the Fig. 7 embodiment of my invention. In the Fig. 7 relay, an operating voltage proportional to a vectorial relationship between transmission line current and voltage is compared with a reference voltage proportional to transmission line voltage, as will now be explained in detail.

The circuit components in Fig. 7 corresponding to components shown and described hereinbefore in connection with Figs. 2 or 3 have been assigned duplicate reference characters. Thus, in Fig. 7, a relatively smooth unipolarity reference voltage related to transmission line voltage E by a preselected proportionality constant D.C. is obtained by means of potential transformer 23, potentiometer 31, full-wave rectifier 24, and a smoothing circuit comprising series choke coil 25, parallel choke coil 26 and capacitor 27, and load resistor 28. The magnitude of the reference voltage produced across resistor 28 is $dcE$, where $d$ is a constant determined by the degree of filtering employed and $c$ is another constant determined by the position of slider 31a on potentiometer 31.

As can be seen in Fig. 7, another potentiometer 36 having a slider 36a is connected across the tapped portion of potentiometer 31 by means of a suitable auxiliary or isolating transformer 37. Derived across the tapped portion of potentiometer 36 is an alternating voltage in phase with the voltage of potentiometer 31 and having a peak magnitude $bcE$, where $b$ is a predetermined constant determined by the position of slider 36a and the turns ratio of the auxiliary transformer 37, the latter preferably being 1:1. The potentiometer 36 is connected in series circuit combination with secondary winding 20c of transforming means 20.

The primary windings of transforming means 20 in Fig. 7 are coupled to transmission line conductors L1 and L2 in a manner previously described, and an alternating voltage representative of the phase current I in the protected transmission line is derived across secondary winding 20c. The peak magnitude of the secondary voltage is $aI$. The preselected constant $a$ vectorially relates this voltage to phase current, and the angle $\phi$ by which voltage leads current may be controlled, for example, by means of an adjustably tapped resistor 38 including a slider 38a connected across secondary winding 20c. Open circuit secondary voltage leads phase current by 90 electrical degrees. The respective circuits in Fig. 7 are poled so that the voltage which appears across the series combination of potentiometer 36 and secondary winding 20c comprises the vector difference between the derived voltages $\overline{aI}$ and $\overline{bcE}$, or in other words $\overline{aI-bcE}$. The difference voltage across this series combination is supplied to a full-wave rectifier 21, and the rectified voltage produced at the direct current terminals of rectifiers 21, which voltage is an accurate representation of the vector difference between an alternating voltage directly related to transmission line current and the transmission line voltage, comprises the operating voltage of the Fig. 7 embodiment of my invention.

As is shown in Fig. 7, the negative terminal of the rectifiers 21 and 24 and of load resistor 28 are all connected in common. The positive direct current terminal of rectifier 21 is connected to an output terminal 39a, and the positive direct current terminal of load resistor 28 is connected to another output terminal 39b. The output terminals 39a and 39b are connected to a sensitive electroresponsive device 40 which may comprise, for example, an electromagnetic switch 41 having an operating winding 42 connected for energization to the output circuit of a suitable current amplifier 43.

The current amplifier 43, which may be of any suitable type, is connected between terminals 39a and 39b and comprises the sensing element of device 40. The amplifier is able to develop sufficient output to operate switch 41 in response to a very low level of energization. Such energization is provided by the control signal produced by the illustrated relay whenever terminal 39a is positive with respect to terminal 39b. In accordance with the principles discussed in detail hereinbefore, this operating condition is obtained when the peak magnitude of operating voltage exceeds the magnitude of reference voltage, and the critical relationship of equality between operating and reference voltages in Fig. 7 is $\overline{aI-bcE}=dcE$.

The peak magnitude of the operating voltage is equal to $\sqrt{[aI\sin(\theta-\phi)]^2+[bcE-aI\cos(\theta-\phi)]^2}$. By equating this quantity to $dcE$ and reducing, the threshold of operation for the Fig. 7 embodiment of my invention obtains when:

$$(b^2-d^2)c^2Z^2 - 2abc\cos(\theta-\phi)Z + a^2 = 0 \quad (4)$$

where Z is $E/I$ or the apparent impedance of the transmission line. Solving Equation 4 by quadratic equation gives:

$$Z = \frac{ab \cos(\theta-\phi)}{c(b^2-d^2)} \pm \sqrt{\left[\frac{ab \cos(\theta-\phi)}{c(b^2-d^2)}\right]^2 - \frac{a^2}{c^2(b^2-d^2)}} \quad (5)$$

Equation 5 defines the operating characteristic of an offset-impedance relay and could be represented on an impedance diagram by a circle whose radius G is equal to $$\frac{ad}{c(b^2-d^2)}$$

and whose center is offset from the origin by a vector $\overline{F}$ of magnitude $$\frac{ab}{c(b^2-d^2)}$$

at an angle $\phi$ with respect to the R axis.

By selecting the proportionality constants $b$ and $d$ equal to each other in Fig. 7, Equation 4 reduces to:

$$Z \cos(\theta-\phi) = \frac{a}{2bc} \quad (6)$$

which defines the operating characteristic of an angle-impedance relay. The operating characteristic Equation 6 has been plotted on the impedance diagram shown in Fig. 6, and the apparently straight line $Z_6$ on this diagram represents the loci of apparent impedance values which define the operating range of the Fig. 7 embodiment of my invention when the constants $b$ and $d$ are made equal to each other. The line $Z_6$ is actually an arc of a circle whose radius G and offset F are both equal to infinity. As can be seen in Fig. 6, the vector $\overline{OH}$ represents the shortest distance between line $Z_6$ and the origin O, and this vector lies perpendicular to line $Z_6$. The vector $\overline{OH}$ has a constant length $$\frac{a}{2bc}$$

and a fixed angle $\phi$ with respect to the R axis. Whenever a transmission line fault is so located that the impedance to the fault includes a component having an angle $\phi$ and magnitude less than $$\frac{a}{2bc}$$

the peak magnitude of operating voltage must be greater than the magnitude of reference voltage and the angle-impedance relay will operate.

A special form of angle-impedance relay is obtained by making the constant angle $\phi$ equal to 90 degrees. This may be accomplished by opening the adjustably tapped resistor 38 to remove as far as practical the load on secondary winding 20c of transforming means 20. The derived secondary voltage will then in effect be related to phase current by a predetermined constant inductive reactance. By substituting 90 degrees for $\phi$ in Equation 6 above, the operating characteristic equation becomes:

$$Z \sin \theta = \frac{a}{2bc} \quad (7)$$

which characterizes a reactance relay. Whenever the reactance to a fault is less than $$\frac{a}{2bc}$$

the reactance relay will operate. Thus, the Fig. 7 embodiment of my invention may be used as a reactance relay when the predetermined constants $b$ and $d$ are made equal to each other and the angle $\phi$ of the vector $\overline{a}$ is selected to be approximately 90 degrees.

The operation of a distance relay constructed in accordance with my invention as described in detail hereinbefore may be conveniently supervised by simple switching means. More specifically, simple switching means may be inserted in the circuits used to derive operating voltage, whereby the relay may be maintained inactive for as long as said switching means is in its open circuit position. A complete relaying system which utilizes this advantageous feature of my invention has been illustrated by way of example in Fig. 8.

Referring now to Fig. 8, a 3-phase electric power transmission line represented by phase conductors L1, L2 and L3 is coupled to an alternating current bus by means of a suitable 3-pole circuit interrupter 44 shown in its closed circuit position. Upon the occurrence of predetermined line-to-ground faults involving transmission line conductor L1, it is desirable to energize a trip coil 45 thereby opening the circuit interrupter 44 and isolating the protected transmission line from the alternating current bus. Toward this end, the protective relaying system shown in Fig. 8 is provided.

The relaying system of Fig. 8 includes a distance relay of the reactance type which is similar to the previously described Fig. 7 embodiment of my invention. A sensitive electromagnetic switching device 46 is provided with a sensing element 47 connected across the output terminals 39a and 39b of the reactance relay. The switching device 46 is actuated to close its normally open contact 48 in response to energization of element 47.

The operating voltage for the reactance relay is obtained by rectifying the difference voltage appearing across the series combination comprising the secondary winding 20c of transforming means 20 and the potentiometer 36. The difference voltage across this series combination is supplied to the full-wave rectifier 21 by means of a circuit including a normally open supervisory contact 49 of a switching device or fault detector 50 to be described more fully hereinafter. The reactance relay is unable to produce an output control signal for energizing the sensing element 47 of switching device 46 as long as supervisory contact 49 is opened.

The reference voltage for the reactance relay is obtained by rectifying and smoothing the voltage derived across a potentiometer 31. The potentiometer 31 is provided with 2 adjustable taps 31a and 31b which, as can be seen in Fig. 8, are selectively connected to the full-wave rectifier 24 by means of a pair of overlapping switch contacts 51 and 52 of a suitable electromagnetic transfer switch 53. Contact 51 is closed when the transfer switch 53 is in its normal, deenergized position, and contact 52 will be closed with the transfer switch in its operated or energized position. An auxiliary transformer 37 which supplies potentiometer 36 in the operating voltage circuit is also connected to the potentiometer 31 through the switch contacts 51 and 52.

The slider 36a of potentiometer 36 is adjusted so that the peak magnitude of the voltage developed across the tapped portion of potentiometer 36 is equal to the magnitude of reference voltage that is produced across load resistor 28, or in other words, so that $b = d$ as explained above in connection with Fig. 7. No load circuit is connected across the secondary winding 20c of transforming means 20, and therefore the angle $\phi$ by which the derived voltage across winding 20c leads transmission line current is approximately 90 degrees. Consequently, the operating characteristic of a reactance relay is obtained. See Equation 7 above.

The reactance relay cannot operate until the reactive component of impedance to a fault is less than the predetermined magnitude $$\frac{a}{2bc}$$

The value of the proportionality constant $c$ in the foregoing expression is determined by the settings of sliders 31a and 31b on potentiometer 31 and by the position of the transfer switch 53. As is shown in Fig. 8, a lower magnitude of voltage is tapped by slider 31b than by slider 31a, and accordingly the constant $c$ is diminished by operating the transfer switch to close contact 52 and open contact 51. In other words, the predetermined magnitude of reactance to which the reactance relay can operably respond is greater with the transfer switch 53 in its operated position than with the transfer switch in its normal position. As is well known to those skilled in the art of protective relaying, this feature of the Fig. 8 relaying system enables multi-zone protection to be selectively obtained, whereby the system can be arranged to provide secondary or back-up protection as well as primary protection.

Potentiometer 31 is supplied by the secondary winding of a potential transformer 54 whose primary winding is connected between transmission line conductor L1 and ground. Transformer 54 is one of a set of three Y-delta-connected potential transformers 54, 55 and 56. Transforming means 20 in the Fig. 8 relaying system is provided with a pair of primary windings 20a and 20b. Winding 20a is connected in the secondary circuit of a current transformer 57 that is coupled to transmission line conductor L1. Transformer 57 is one of a set of three Y-connected current transformers 57, 58 and 59. The primary winding 20b of transforming means 20 is serially connected in the residual circuit 60 of the current transformers as shown, whereby the transforming means may be energized by zero sequence current to compensate for a corresponding zero sequence component in the line-to-ground voltage of potential transformer 54. The above described potential transformer and current transformer connections, which are well known in the art, ensure accurate and consistent operation by the reactance relay only in response to the positive-phase-sequence reactive component of the apparent impedance of transmission line conductor L1 between the relay location and ground.

An operating winding 61 of a suitable directional relay 62 is connected in the residual current transformer circuit 60. The directional relay 62, which has been shown in block form in Fig. 8, may be of any well known type responsive to the direction of electric power flow in the residual circuit 60. For this purpose, relay 62 is provided with a polarizing winding 63 which is connected across a corner of the delta-connected secondary windings of the potential transformers 54—56. The relay 62 operates substantially instantaneously to close a pair of normally open contacts 64 whenever ground current is flowing through the line in a direction from the alternating current bus toward the protected transmission line. Whenever a line-to-ground fault occurs behind the relay location, e.g., on the alternating current bus itself, the contacts 64 of relay 62 remain open thereby preventing ultimate operation of the relaying system as will become apparent hereinafter.

An operating winding 65 of the switching device or fault detector 50 is also connected in the residual circuit 60. The fault detector is arranged to operate with no intentional time delay whenever its winding 65 is energized by residuary current in excess of a predetermined quantity, said predetermined quantity of residuary current being greater than an amount corresponding to the maximum permissible unbalanced load conditions but less than an amount corresponding to the minimum line-to-ground fault current to which the protective relaying system is designed to respond. The fault detector 50 is provided with the normally open supervisory contact 49 mentioned above and with another normally open contact 66. As will be understood by those skilled in the art, it may be desirable to have the supervisory function performed by some relay other than the specific fault detector 50 shown in Fig. 8. For example, the relay illustrated in Fig. 3 might be used as the fault detector to obtain a particularly desirable relaying system.

Contact 64 of directional relay 62, contact 66 of fault detector 50, and contact 48 of switching device 46 are connected in series circuit relationship between the positive terminal 67 of a suitable source of unidirectional control power, not shown, and the trip coil 45 of circuit interrupter 44. The trip coil 45 is connected to a negative terminal 68 of the control power source through a normally open auxiliary switch 69 of the circuit interrupter 44, as can be seen in Fig. 8. Thus, the trip coil 45 is energized to open the circuit interrupter whenever all three of the contacts 64, 66 and 48 are closed contemporaneously.

The contacts 64 and 66 are connected to another negative terminal 70 of the unidirectional control power source in series circuit relationship with an operating winding 71 of a timing unit 72 shown schematically in Fig. 8. The timing unit 72 may be of any suitable type, such as, for example, the illustrated electromagnetic device provided with a dashpot 73 to retard the movement of a bridging contact 74. Whenever operating winding 71 is energized, the bridging contact 74 moves slowly away from its normally open position. After a first predetermined time delay, contact 74 slidably engages a pair of cooperating stationary contacts 75 which are connected to the positive and negative control power terminals 67 and 70 in series with an operating winding 76 of the transfer switch 53. As a result, an energizing circuit is completed for winding 76, and the transfer switch 53 operates. Bridging contact 74 remains in engagement with stationary contacts 75 for only a relatively short interval of time, after which the transfer switch 53 is deenergized and returns to its normal position. After a second, longer predetermined interval of time has elapsed following energization of the timing unit 72, bridging contact 74 comes into engagement with another pair of stationary contacts 77 which are connected in parallel with contact 48 of the switching device 46.

From the foregoing detailed description of the circuit components and connections of the Fig. 8 protective relaying system, its mode of operation may now be readily followed. The operation involves essentially three steps.

(1) Upon the occurrence of a ground fault involving conductor L1 of the protected transmission line and located within a first predetermined distance from the relay, whereby the line reactance as viewed from the relay location is less than a first predetermined magnitude determined by the setting of slider 31a on potentiometer 31, substantially instantaneous operation of the relaying system to energize trip coil 45 and thereby open circuit interrupter 44 is desired. This desired result is obtained. The reactance relay will respond immediately to any values of reactance less than said first predetermined magnitude to produce an output control signal which energizes the switching device 46 thereby closing contact 48, it being understood that the aforesaid line- to-ground fault causes sufficient current to flow in the proper direction in the residual current transformer circuit 60 to operably energize the fault detector 50 and the directional relay 62 thereby closing contacts 66 and 64, respectively.

(2) Should conductor L1 be unintentionally grounded at a point beyond said first predetermined distance but within a second predetermined distance from the relay location, whereby the reactance of the line between relay and fault locations is greater than said first predetermined magnitude but less than a second predetermined magnitude determined by the setting of slider 31b on potentiometer 31, operation of the relaying system to energize trip coil 45 is desired only after a first predetermined time delay. The reactance relay whose operating range is initially determined by the position of potentiometer slider 31a, since the transfer switch 53 initially is in its normal position with switch contact 51 closed, can not operate immediately to energize switching device 46. But the timing unit 72 is energized by the closure of contacts 66 and 64 of fault detector 50 and directional relay 62, respectively, due to the residuary current in circuit 60, and bridging contact 74 immediately begins its movement toward stationary contacts 75. At the end of said first predetermined time delay, contact 74 engages contacts 75, and thus the transfer switch 53 is operated to close its contact 52 and open contact 51. Now slider 31b determines the operating range of the reactance relay, and the reactance relay will operably respond to any value of reactance less than said second predetermined magnitude to energize the switching device 46 thereby closing contact 48. As a result, contacts 48, 66 and 64 are contemporaneously closed, and the circuit interrupter trip coil 45 is energized.

(3) Upon the occurrence of a fault between conductor L1 and ground located beyond said second predetermined distance from the relay, whereby the reactance to the fault is greater than said second predetermined magnitude, operation of the relaying system to energize trip coil 45 is desired only after a second, longer predetermined time delay. This latter operation performs the back-up protective function of the relaying system. The reactance relay will not respond to this more distant fault, since the reactance to the fault is greater than the maximum magnitude of reactance that can cause relay operation. But at the end of said second predetermined time delay, bridging contact 74 of the timing unit 72 engages stationary contacts 77 to complete the energizing circuit of the trip coil 45 through the presently closed contacts 66 and 64 of fault detector 50 and directional relay 62, respectively.

The reactance relay of the Fig. 8 relaying system can never operate to energize switching device 46 until the supervisory contact 48 has been closed. This feature of the relaying system prevents energization of the switching device 46 under normal, unfaulted conditions. Under normal operating conditions it is possible that the reactive component of apparent line-to-ground impedance as viewed from the relay location may be sufficiently low to cause operation of the reactance relay, but since such operation is supervised by contact 49 of the fault detector 50, it can not take place until an actual fault exists. If the reactance relay were permitted to operate thereby energizing the device 46 and maintaining contact 48 closed during normal conditions, a subsequent fault in response to which fault detector 50 and directional relay 62 operate to close contacts 66 and 64, respectively, might result in incorrect operation of the relaying system.

While I have shown and described preferred forms of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. In a distance relay adapted to energize an electroresponsive device in response to predetermined magnitude and phase relationships between alternating current and alternating voltage in an electric power transmission line: a first voltage producing means responsive to transmission line voltage for continuously producing a unipolarity reference voltage representative of the line voltage; means responsive to transmission line current for deriving a first alternating voltage having a preedetermined constant relationship to the line current; means responsive to line voltage for deriving a second alternating voltage proportional to the line voltage; a second voltage producing means responsive to said first and second derived alternating voltages for producing a unipolarity operating voltage representative of the vector difference between said first and second voltages; and unilaterally conductive circuit means, including said first and second voltage producing means interconnected in series and oppositely poled, adapted for connection to the electroresponsive device to form a loop circuit wherein energizing current can flow whenever the magnitude of said operating voltage exceeds the magnitude of said reference voltage.

2. In an offset-impedance relay for an alternating current electric power transmission line: first and second output terminals; a first full-wave rectifier having a pair of direct current terminals and a pair of alternating current terminals; means coupled to the transmission line for applying to the alternating current terminals of said first rectifier a voltage proportional to transmission line voltage; a smoothing circuit connected to the direct current terminals of said first rectifier, said smoothing circuit including a load resistor across which is developed a relatively smooth direct voltage representative of line voltage, said load resistor having a positive terminal connected to said first output terminal and having a negative terminal; transforming means responsive to transmission line current for deriving an alternating voltage related to the line current by a predetermined constant impedance; a second full-wave rectifier having positive and negative direct current terminals and a pair of alternating current terminals, said positive direct current terminal being connected to said second output terminal and said negative direct current terminal being connected to said negative terminal of said load resistor; and means coupled to the transmission line and to said transforming means for energizing the alternating current terminals of said second rectifier in accordance with the vector difference between said derived alternating voltage and a pre-selected portion of the line voltage; whereby an output control signal is developed at said output terminals whenever the magnitude of said direct voltage is less than the instantaneous magnitude of the voltage at the alternating current terminals of said second rectifier.

3. A distance relay adapted to energize an electroresponsive device in response to predetermined magnitude and phase relationships between the current and voltage of an alternating current electric power transmission line, comprising: first means responsive to transmission line voltage for producing a relatively smooth unipolarity reference voltage, the magnitude of said reference voltage being related to line voltage by a preselected proportionality constant; second means responsive to transmission line voltage for developing a first alternating voltage, the peak magnitude of said first alternating voltage being related to line voltage by said preselected proportionality constant; transforming means responsive to transmission line current for deriving a second alternating voltage representative of line current; means responsive to the vector difference between said first and second alternating voltages for producing a unipolarity operating voltage, the peak magnitude of said operating voltage being equal to the peak magnitude of said vector difference; and unilaterally conductive circuit means, including both of said unipolarity voltage producing means, for applying said operating and reference voltages in voltage opposing relationship to the electroresponsive device, whereby energizing current can flow to the electroresponsive device only when the magnitude of said operating voltage exceeds the magnitude of said reference voltage.

4. A distance relay adapted to energize an electroresponsive device in response to predetermined magnitude and phase relationships between the current and voltage of an alternating current electric power transmission line, comprising: first means responsive to transmission line voltage for producing a relatively smooth unipolarity reference voltage, the magnitude of said reference voltage being related to line voltage by a first preselected proportionality constant; second means responsive to transmission line voltage for developing a first alternating voltage, the peak magnitude of said first alternating voltage being related to line voltage by a second preselected proportionality constant; transforming means responsive to transmission line current for deriving a second alternating voltage representative of line current; means responsive to the vector difference between said first and second alternating voltages for producing a unipolarity operating voltage, the peak magnitude of said operating voltage being related to the peak magnitude of said vector difference by a third preselected proportionality constant, the product of said second and third preselected proportionality constants being equal to said first preselected proportionality constant; and unilaterally conductive circuit means, including both of said unipolarity voltage producing means, for applying said operating and reference voltages in voltage opposing relationship to the electroresponsive device, whereby energizing current can flow to the electroresponsive device only when the magnitude of said operating voltage exceeds the magnitude of said reference voltage.

5. In an angle-impedance relay for an alternating current electric power transmission line: first and second output terminals; a first full-wave rectifier having a pair of direct current terminals and a pair of alternating current terminals; means coupled to the transmission line for applying to the alternating current terminals of said first rectifier a first voltage representative of transmission line voltage; a smoothing circuit connected to the direct current terminals of said first rectifier, said smoothing circuit including a load resistor across which is developed a relatively smooth direct voltage related to line voltage by a preselected proportionality constant, said load resistor having a positive terminal connected to said first output terminal and having a negative terminal; a second full-wave rectifier having positive and negative direct current terminals and a pair of alternating current terminals, said positive direct current terminal being connected to said second output terminal and said negative direct current terminal being connected to the negative terminal of said load resistor; transforming means responsive to transmission line current for deriving an alternating voltage related to the line current by a predetermined constant impedance; and means, coupled to the transmission line and to said transforming means, for applying to the alternating current terminals of said second rectifier a voltage equal to the vector difference between said derived alternating voltage and a second voltage representative of line voltage, the peak magnitude of said second voltage being related to the line voltage by said preselected proportionality constant; whereby an output control signal is developed at said output terminals whenever the magnitude of said direct voltage is less than the instantaneous magnitude of the voltage applied to the alternating current terminals of said second rectifier.

6. In an angle-impedance relay for an alternating current electric power transmission line: first and second output terminals; a first full-wave rectifier having a pair of direct current terminals and a pair of alternating current terminals; means coupled to the transmission line for applying to the alternating current terminals of said first rectifier a voltage representative of transmission line voltage; a smoothing circuit connected to the direct current terminals of said first rectifier, said smoothing circuit including a load resistor across which is developed a relatively smooth direct voltage related to line voltage by a preselected proportionality constant, said load resistor having a positive terminal connected to said first output terminal and having a negative terminal; a second full-wave rectifier having positive and negative direct current terminals and a pair of alternating current terminals, said positive direct current terminal being connected to said second output terminal and said negative direct current terminal being connected to the negative terminal of said load resistor; transforming means responsive to transmission line current for deriving an alternating voltage related to the line current by a predetermined constant impedance; and means coupled to the transmission line and to said transforming means for applying to the alternating current terminals of said second rectifier a voltage related by said preselected proportionality constant to the vector difference between the line voltage and a voltage proportional to said derived alternating voltage; whereby an output control signal is developed at said output terminals whenever the magnitude of said direct voltage is less than the instantaneous magnitude of the voltage applied to the alternating current terminals of said second rectifier.

7. A distance relay adapted to energize an electroresponsive device in response to predetermined magnitude and phase relationships between the current and voltage of an alternating current electric power transmission line, comprising: first means responsive to transmission line voltage for producing a relatively smooth unipolarity reference voltage, the magnitude of said reference voltage being related to line voltage by a preselected proportionality constant; second means responsive to transmission line voltage for developing a first alternating voltage, the peak magnitude of said first alternating voltage being related to line voltage by said preselected proportionality constant; transforming means responsive to transmission line current for deriving a second alternating voltage representative of line current and displaced 90 electrical degrees therefrom; means responsive to the vector difference between said first and second alternating voltages for producing a unipolarity operating voltage, the peak magnitude of said operating voltage being equal to the peak magnitude of said vector difference; and unilaterally conductive circuit means, including both of said unipolarity voltage producing means, for applying said operating and reference voltages in voltage opposing relationship to the electroresponsive device, whereby energizing current can flow to the electroresponsive device only when the magnitude of said operating voltage exceeds the magnitude of said reference voltage.

8. In a distance relay adapted to energize an electroresponsive device in response to predetermined magnitude and phase relationships between the current and voltage of an alternating current electric power transmission line: means responsive to transmission line voltage for producing relatively smooth direct voltage, the magnitude of said direct voltage being related to line voltage by a preselected proportionality constant; means responsive to transmission line voltage for developing a first alternating voltage, the peak magnitude of said first alternating voltage being related to line voltage by said preselected proportionality constant; transforming means responsive to transmission line current for deriving a second alternating voltage related to line current by a predetermined constant reactance; rectifying means having alternating current and direct current terminals, said alternating current terminals being supplied by the vector difference between said first and second alternating voltages; and unilaterally condutcive circuit means, including said direct voltage producing means and said rectifying means interconnected in series and oppositely poled, adapted for connection to the electroresponsive device to form a loop circuit wherein energizing current can flow only when the reactive component of the ratio of transmission line voltage to current is less than the ratio of said predetermined contsant reactance to twice said preselected proportionality constant.

9. In a reactance relay for an alternating current electric power transmission line: first and second output terminals; a first full-wave rectifier having a pair of direct current terminals and a pair of alternating current terminals; means coupled to the transmission line for applying to the alternating current terminals of said first rectifier a voltage representative of transmission line voltage; a smoothing circuit connected to the direct current terminals of said first rectifier, said smoothing circuit including a load resistor across which is developed a relatively smooth direct voltage related to line voltage by a preselected proportionality constant, said load resistor having a positive terminal connected to said first output terminal and having a negative terminal; a second full-wave rectifier having positive and negative direct current terminals and a pair of alternating current terminals, said positive direct current terminal being connected to said second output terminal and said negative direct current terminal being connected to the negative terminal of said load resistor; transforming means responsive to transmission line current for deriving an alternating voltage related to the line current by a predetermined constant reactance; and means coupled to the transmission line and to said transforming means for applying to the alternating current terminals of said second rectifier a voltage equal to the vector difference between said derived alternating voltage and a voltage whose peak magnitude is related to the line voltage by said preselected proportionality constant; whereby an output control signal is developed at said output terminals whenever the magnitude of said direct voltage is less than the instantaneous magnitude of the voltage applied to the alternating current terminals of said second rectifier.

10. A distance relay for an alternating current electric power transmission line, comprising: a pair of direct voltage producing rectifying means each having alternating current and direct current terminals; first means inductively coupled to the transmission line and conductively coupled to the alternating current terminals of a first one of said rectifying means for supplying an alternating voltage proportional to a first electric quantity of the line; second means inductively coupled to the transmission line and conductively coupled to the alternating current terminals of the second one of said rectifying means for supplying an alternating voltage proportional to the vector difference between a preselected portion of a second electric quantity of the line and a third electric quantity having a predetermined constant relationship to said first quantity; switching means having a normally open supervisory contact serially connected in the conductive coupling between one of said alternating voltage supplying means and one of the alternating current terminals of the associated rectifying means, said switching means being actuated to close its supervisory contact in response to the occurrence of a fault on the transmission line; a smoothing circuit associated with only one of said rectifying means for smoothing the direct voltage produced thereby; a pair of output terminals; and circuit means serially connecting the direct current terminals of both of said rectifying means to said output terminals in polarity opposing relationship; whereby said output terminals are energized in accordance with the difference between the direct voltages produced by said rectifying means when said supervisory contact is closed and the magnitude of the voltage produced by the rectifying means with which said smoothing circuit is associated is less than the magnitude of the voltage produced by the other rectifying means.

11. A relaying system for protecting an alternating current electric power transmission line having an electroresponsively tripped circuit interrupter located at one terminal thereof, comprising: means responsive to a first electric quantity of the line for deriving a single alternating voltage proportional thereto; means responsive to a second electric quantity of the line for deriving two alternating voltages each being proportional to said second quantity; transfer means connected in circuit with one of said voltage deriving means and actuatable to change the proportionality between the derived voltage and the corresponding electric quantity; means responsive to one of said two derived voltages for producing a representative direct voltage; means responsive to said single alternating voltage and to the other of said two derived voltages for producing a direct voltage representative of the vector difference therebetween; a pair of output terminals; circuit means serially connecting both of said direct voltage producing means to said output terminals in voltage opposing relationship thereby to develop at said terminals an output control signal when the magnitude of a predetermined one of said direct voltages is greater than the magnitude of the other direct voltage; fault responsive means operable in response to predetermined transmission line conditions, said fault responsive means including a normally open supervisory contact connected in circuit with one of said direct voltage producing means to prevent the development of said output control signal until after the occurrence of a transmission line fault; directional relay means operable in response to a fault occurring in the direction of the protected transmission line; a timing unit responsive, after a predetermined time delay, to the operation of both said fault responsive means and said directional relay means to actuate said transfer means; and means coupled to said output terminals and responsive to said output control signal to trip the circuit interrupter.

References Cited in the file of this patent

UNITED STATES PATENTS

| | | |
|---|---|---|
| 2,381,375 | Warrington | Aug. 7, 1945 |
| 2,381,527 | Traver | Aug. 7, 1945 |
| 2,509,025 | Warrington | May 23, 1950 |
| 2,775,725 | Ellis | Dec. 25, 1956 |
| 2,804,578 | Bergseth | Aug. 27, 1957 |
| 2,845,581 | Hodges | July 29, 1958 |

FOREIGN PATENTS

| | | |
|---|---|---|
| 589,153 | Germany | Dec. 4, 1933 |
| 66,170 | Norway | May 3, 1943 |
| 566,805 | Great Britain | Jan. 15, 1945 |
| 750,695 | Great Britain | June 20, 1956 |